F. W. DENBROOK.
MOTOR DRIVEN SLED.
APPLICATION FILED APR. 18, 1921.
1,422,751.
Patented July 11, 1922.
2 SHEETS—SHEET 1.
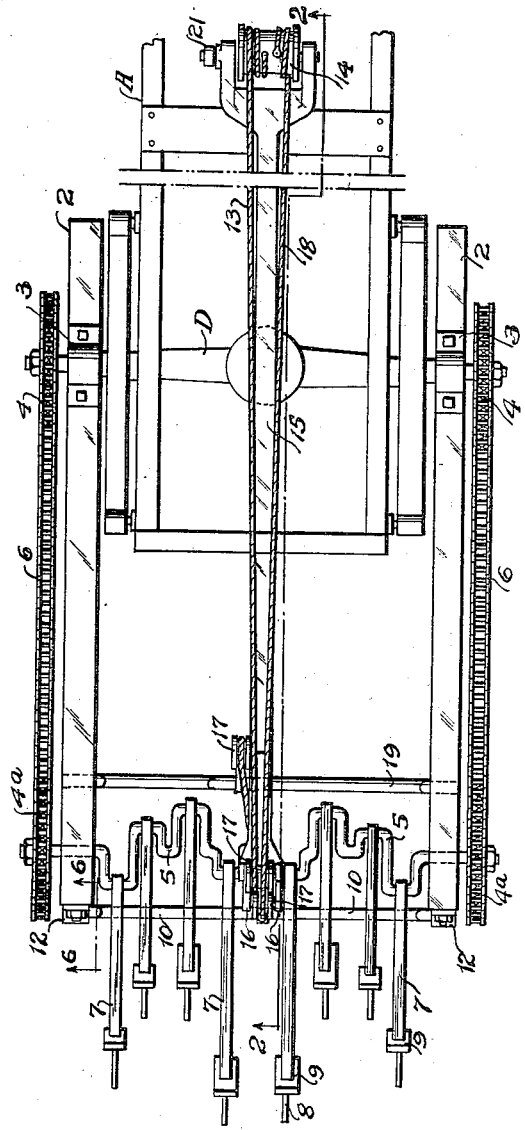
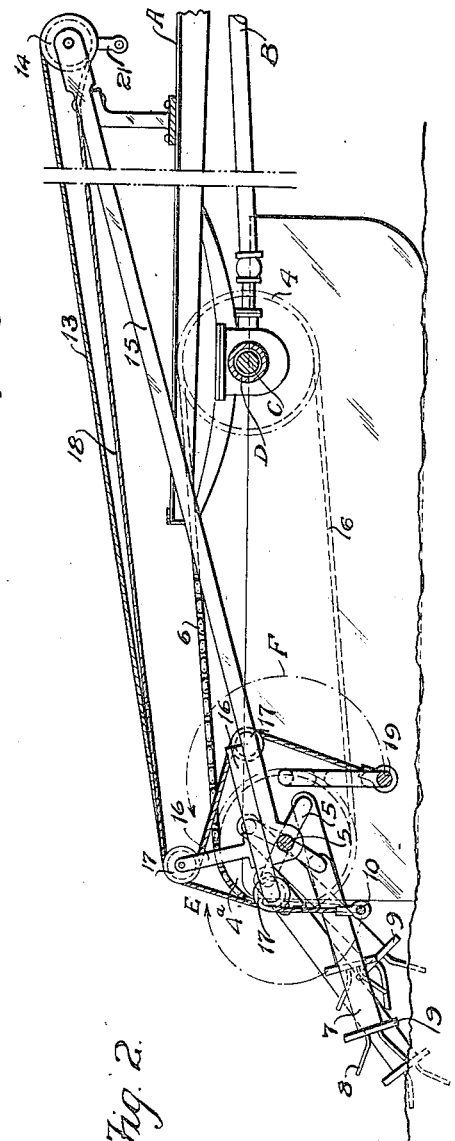
Inventor
F. W. Denbrook.
By H. B. Wilson & Co.
Attorney

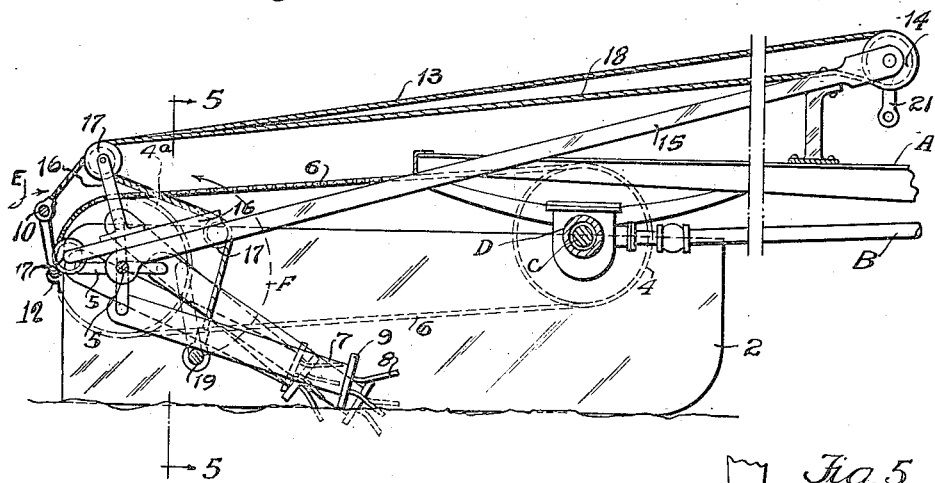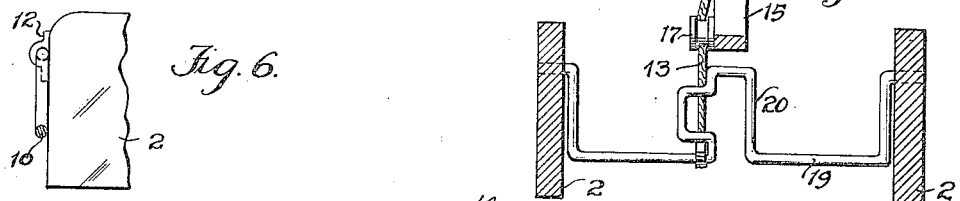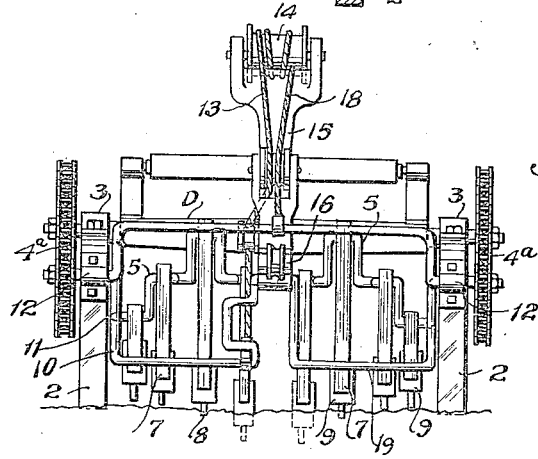

UNITED STATES PATENT OFFICE.

FRED W. DENBROOK, OF FOND DU LAC, WISCONSIN.

MOTOR-DRIVEN SLED.

1,422,751. Specification of Letters Patent. Patented July 11, 1922.

Application filed April 18, 1921. Serial No. 462,103.

*To all whom it may concern:*

Be it known that I, FRED W. DENBROOK, a citizen of the United States, residing at Fond du Lac, in the county of Fond du Lac and State of Wisconsin, have invented certain new and useful Improvements in Motor-Driven Sleds; and I do declare the following to be a full, clear, and exact description of the invention, such as will enable others skilled in the art to which it appertains to make and use the same.

This invention relates to an improved motor driven sled, which is especially, but not necessarily, designed for attachment to automobiles to enable the latter to be effectively propelled over ice and snow covered surfaces.

The principal object of the invention is to provide a sled of the above type which is an improvement over prior patented devices used for the same purpose, my improved sled embodying a plurality of successively operated steppers actuated by means driven from the rear axle of the automobile, the construction and arrangement of parts being such that it does not necessitate any change in construction of the automobile with the exception of the removal of the rear wheels.

Another and very important object of the invention is to provide a sled of this type embodying the aforesaid steppers which are normally arranged in a rearwardly and downwardly inclined position for propelling the vehicle and sled in a forward direction and have novel means associated therewith for quickly arranging them in the proper angular position for propelling the vehicle in a reverse direction.

Other objects and advantages of the invention will be apparent during the course of the following description.

In the accompanying drawings forming a part of this specification and in which like numerals are employed to designate like parts through the same:

Figure 1 is a top plan view of a sled constructed in accordance with this invention showing the same attached to the rear end of an automobile chassis.

Figure 2 is a central longitudinal sectional view taken substantially on the plane of the line 2—2 of Fig. 1 showing the steppers in the angular position for driving the vehicle in a forward direction.

Figure 3 is a view like Fig. 2 showing the position of the steppers reversed to drive the vehicle in an opposite direction.

Figure 4 is a rear end elevation of the sled.

Figure 5 is a detailed section taken substantially on the plane of the line 5—5 of Fig. 3.

Figure 6 is a detailed section taken on the line 6—6 of Figure 1.

As before intimated, the improved sled indicated as a whole by the numeral 1, is designed primarily to support the rear end of an automobile A which in the showing has the body removed. In the drawing, the automobile is equipped with a drive shaft B which imparts rotation to the axle C arranged within the axle tubing D as is usual. Other details are shown but need not be described here.

The axle casing D is disposed transversely across the upper edges of the spaced runners 2 of the sled and is held thereon by suitable brackets 3. When my improved sled is attached to the automobile, the wheels which are ordinarily supported on the axles C are removed and sprocket wheels 4 are substituted therefor, being held in place in any suitable way. At the opposite ends of the runners, a crank shaft 5 is positioned between them, the extended ends thereof being equipped with sprocket wheels $4^a$ rotated from the first named sprocket wheels by means of chains 6 which surround them. At this point, I wish to make it known that I do not desire to limit myself to this exact driving means since other means could well be employed. Proceeding, it is to be pointed out that the crank portions of the shaft 5 have a plurality of successively operable steppers 7 pivotally connected thereto, these steppers being preferably provided at their free ends with spurs 8 and stops 9 to limit the distance of insertion of spurs into the ground or other surface over which the sled is propelled. Under ordinary circumstances, the steppers 7 are disposed in the rearwardly and downwardly inclined position indicated in Figure 2, whereby when the crank shaft is rotated, they will act to propel the vehicle and sled in a forward direction. To support these steppers and cause them to assume the angular positions shown, I make use of novel supporting means 10, preferably in the form of a rod, the same being disposed beneath the steppers and crank shaft and normally resting against the rear end of the runner 2. A careful examination of this rod will disclose the fact that its opposite ends are directed laterally in the same direction as indicated at 11 (better seen in Fig. 4), being connected to the rear ends of the runners by suitable brackets 12. With this construction, it will be seen that by swinging the rod 10 on its pivot in upward direction, it will elevate the steppers so that they can be thrown over in a circular manner as indicated by the arrow E to position these steppers on the opposite side of the crank shaft in the angular position disclosed in Figure 3, in which position they serve to propel the vehicle in a reverse or opposite direction. For the purpose of imparting movement to the bar 10, any suitable means may be employed. For the purpose of illustration, I have shown a cable or other suitable flexible element 13, the same being connected in any suitable way at its rear end to the intermediate portion of the rod 10 and connected at its opposite end to a drum 14. While on this drum, it may be well to point out that it can be mounted at any suitable place on the automobile to be conveniently actuated by the driver or other occupant and it may be supported in any suitable way such as for instance, by means of the inclined rod 15 which is in turn supported by the crank shaft 5 if desired, it of course, being understood that it may be connected to any other suitable part of the sled if desired. It may also be pointed out that the rod 15 is connected to the exact center of the crank shaft and is therefore not moved by rotation of the latter. This rod not only serves to support the drum, but has connected with it at its rear end, one or more arms 16 carrying pulleys 17 over which the cables 13 and 18 pass. By referring to the cable 18, it will be noted that this one is also connected at its forward end to the drum 14, being wound on the latter in a direction opposite that which the first named cable is wound thereon. On the other hand, the opposite end of this cable 18 is passed over the proper pulleys 17 as shown and connected at its opposite end to the intermediate portion of the pivotally mounted stop and supporting rod 19 which is substantially a duplicate of the rod 10 and serves the same purpose as the latter. The intermediate portion of the rod 19 however is bent as indicated at 20 to permit it to clear the adjacent arm 16 and pulley 17 carried thereby when it is moved upwardly in the direction of the arrow F to return the steppers to their original position. Here, I may state that the drum 14 is equipped with a handle 21 for the purpose of rotating it. However, any suitable means may be employed for accomplishing this end.

In use, it will be seen that rotation of the driving axle C of the automobile will cause rotation of the sprockets and chains and will in turn operate the crank shaft 5. In so doing, the steppers will be moved in an oscillatory manner and successively engage the ground and impart movement to the sled and automobile. If the steppers are in the downward rearwardly inclined position indicated in Fig. 2, it is obvious that the vehicle will be driven forward. If it is desired to reverse the direction of movement, this may be done by grasping the handle 21 and rotating the drum 14 in such a way as to wind the cable 13 thereon. This will lift the rod 10 which will in turn elevate the steppers and enable them to be thrown over in a circular manner so as to assume the angular position disclosed in Fig. 3, whereby the vehicle may be propelled in a reverse or opposite direction. It is obvious that as the cable 13 is being wound on the drum, the cable 18 is being unwound and therefore has no effect on the rod 19 to which it is connected. On the other hand, when the drum is rotated in an opposite direction and the cable 18 wound thereon, the rod 19 will be brought into action so as to throw the steppers in the circular manner indicated by the arrow F, whereby they will assume their original position. During the operation of the cables, the pulleys over which they run will serve to maintain them under the proper and desired tension.

A careful review of the foregoing description taken in connection with the accompanying drawings will be sufficient to enable persons skilled in the art to which the invention relates to obtain a clear understanding of the same. Therefore, a more lengthy and detailed description is deemed unnecessary.

Since probably the best results may be obtained with the construction and arrangement herein shown and described, this construction and arrangement is taken as a preferred embodiment of the invention. However, slight minor changes coming within the scope of the subjoined claims may be resorted to.

I claim:

1. A device of the class described comprising a support, a plurality of rearwardly and downwardly inclined surface engaging steppers pivotally mounted on said support, a supporting member on which said steppers rest and by which they are guided, and means for elevating said member to move the same in a circular manner to cause the steppers to assume a forwardly and downwardly inclined position, whereby to drive the support in a reverse direction.

2. A motor driven sled comprising spaced runners, a crank shaft disposed between said runners, a plurality of steppers pivotally connected to the crank portions of the shaft, a rod supported on the rear end of said runners, the opposite ends thereof being directed laterally in the same direction and pivotally connected with said runners, a flexible element connected with the intermediate portion of said rod to swing it upwardly on its pivot for elevating and moving said steppers in a circular manner, and means for supporting the steppers in a forwardly and downwardly inclined position for reversing the direction of movement of the sled, said means serving to return the steppers to their original rearwardly and downwardly inclined position when actuated.

3. A device of the class described comprising a support, a plurality of surface-engaging steppers pivotally mounted on said support, and pivotally mounted supporting and guiding members arranged on opposite sides of the pivot points of the steppers for supporting the latter in downwardly inclined positions on either side of said pivot points, said supporting members being operated separately and successively to elevate and swing the steppers in a circular manner to dispose them in an angular position on either side of the aforesaid pivot points, whereby to permit the support to be propelled in one direction when the steppers are resting on one of the guiding and supporting members, and vice versa.

4. A motor driven sled including a pair of spaced runners, a crank shaft supported therebetween at the rear end thereof, steppers pivoted on the crank portions of the shaft, substantially U-shaped rods disposed in parallelism with the shaft, being pivotally connected to the runners, one in rear of the shaft and the other in advance of the latter, a drum, and cables wound in opposite directions thereon, being connected at their rear ends to said rods between the ends of the latter for changing the angular position of the steppers for forward or rearward driving.

5. A device of the class described comprising a support, a crank shaft associated therewith, a plurality of surface-engaging and propelling steppers pivotally connected with the crank portions of said shaft, substantially U-shaped rods disposed in parallelism with said shaft and arranged on opposite sides of the shaft for alternately supporting the steppers in downwardly inclined positions on either side of said shaft, and means for separately and successively elevating either of said rods to a position to swing the steppers in a circular manner to dispose them in the proper angular positions for propelling the support in one direction when resting on the U-shaped rod in front of the shaft and propelling it in an opposite direction when resting on the remaining rod.

In testimony whereof I have hereunto set my hand.

FRED W. DENBROOK.